UNITED STATES PATENT OFFICE.

CHARLES A. WEEKS, OF PHILADELPHIA, PENNSYLVANIA; LOUISE H. WEEKS EXECUTRIX OF SAID CHARLES A. WEEKS, DECEASED.

GERMICIDE.

1,366,106.  Specification of Letters Patent.  Patented Jan. 18, 1921.

No Drawing.  Application filed June 15, 1918. Serial No. 240,176.

*To all whom it may concern:*

Be it known that I, CHARLES A. WEEKS, citizen of the United States, and resident of Philadelphia, county of Philadelphia, and State of Pennsylvania, have invented an Improvement in Germicides, of which the following is a specification.

My invention has for its object the production of a healing solution for use in surgical operations, which may be employed without danger or the necessity of undue skill, and the use of which solution is highly efficient from a pathological point of view.

My object is further to produce a non-irritant solution for use in surgical operations which, when brought into contact with the putrid secretions, will destroy microbic conditions and convert morbid matter into less virulent forms conducive to healing.

My object is further, to provide a solution of such composition that when brought into association with the nitrogenous elements, it liberates the chlorin and as a result, destroys the cause of the production of the objectionable secretions, thereby giving nature the opportunity of throwing off or eliminating the objectionable matters and permitting normal skin and flesh reactions to take place with the resultant healing.

My invention consists of a chlorinated product derived from the oil of eucalyptus, and containing a large percentage of chlorin (25 to 50% by weight) and also sufficient hydrochloric and other acids not as yet clearly identified, to give to the compound a decidedly acid nature.

My improved product, technically named "chlorlyptus," is a dichlorid of eucalyptus and is prepared by subjecting the oil of eucalyptus, containing approximately 70% of cineal ($C_{10}H_{18}O$) 15% of cymene ($C_{10}H_{14}$) and 15% of pinene ($C_{10}H_{16}$), to a stream of dry chlorin gas at a regulated temperature and pressure and as the result of which, the eucalyptus oil is converted into the dichlorid having the formula $C_{10}H_{16}OCl_2$.

For treating the eucalyptus oil with the chlorin gas, I have found the following procedure to be preferable:—The oil is placed in a relatively tall vessel so as to provide a considerable depth (18 to 24 inches) relatively to its cross sectional area (3 to 4 square inches), and the chlorin gas is admitted at the bottom so that it flows upward through the oil. The height of the column of oil provides the desired pressure to insure the sub-division of the chlorin gas and its intimate contact with the oil in its upward passage, which action increases the rapidity of the process and reduces the loss from escaping chlorin gas. During this operation the oil may be subjected to a moderate temperature (100 to 125 degrees, F.) to facilitate the chlorinating thereof. As a result of this treatment, the hydrogen contained in the eucalyptus oil is caused to combine with part of the chlorin to form hydrochloric acid, which is largely driven off; and while this is taking place, the acidified product may, if desired, be subjected to the oxidizing effect of air or ozone to facilitate the more complete removal of the hydrochloric acid, together with any impurities of a carbonaceous or other character that the crude oil may have contained. After the greater part of the hydrochloric acid has been driven off, the chlorin gas is continued to be introduced until the desired percentage, by weight, of chlorin is incorporated in the resulting dihydrochlorid product.

During this treatment, it appears that the chlorin becomes held in chemical combination, principally as may be designated by the formula $C_{10}H_{16}OCl_2$ which may be defined as a dichlorid and constituting a compound containing approximately 31% of chlorin.

As before stated, the product is of an acid nature due to the presence of hydrochloric and organic acids not as yet clearly identified, and this acidity may be determined as follows: 5 cubic centimeters of chlorlyptus may be shaken with 25 times its volume of distilled water and after permitting the oil to settle, the supernatant liquid will have such an acidity that one cubic centimeter thereof diluted with 15 cubic centimeters of water is neutralized by 0.45 cubic centimeters normal sodium hydroxid. From careful tests, it appears that this acidity is largely due to the presence of the (organic) acids not as yet clearly identified and which may constitute approximately 75% of the entire acid present.

In respect to the quantity of the chlorin contained in my acid chlorlyptus compound aforesaid, careful tests have demonstrated that the compound contains from 25 to 50 per cent., by weight, of chlorin, and in the preferred form, this percentage is approximately 31%. The chlorin contained in the compound is retained under such conditions that even with the product in an unsealed state, the chlorin remains in the compound and for that reason, the solution may be considered as a stabilized chlorinated product. Unlike many germicides, chlorlyptus may be kept for an almost indefinite length of time without loosing its efficacy as a chlorinated compound.

The chlorlyptus compound prepared as herein set out, is a heavy, oily liquid, of a reddish-brown color. It is acid in reaction and possesses a pleasant aromatic odor which is slightly chlorinous. Its specific gravity is approximately 1.2. It is easily soluble in paraffin oil, alcohol and ether, and miscible in water, petrolates, salves and unguents.

I have described my improved compound as being made from oil of eucalyptus, and while I prefer this member of the terpene family as the base of my compound, I may also use eucalyptol derived therefrom with satisfactory results and, therefore, consider the use of this latter substance as also within the scope of my invention.

A germicide of this character should meet two main requirements, namely, it must kill all parasitic life and at the same time it must not harm the cells of the living body. These requirements are fulfilled by the solution above described because the chlorin, in its first reaction upon the proteins of the deceased body, induces the formation of chloramins, which are active germicidal agents. The virtue of the solution as a germicide is largely dependent upon the available amount of chlorin which it carries, and as it may carry from 25 to 50 per cent., of chlorin, an amount which, as far as I am aware, is greatly in excess of the chlorin content of any other germicide solution, it is manifest that my improved solution has qualities which are especially advantageous where heroic treatment becomes necessary. On the other hand, where the solution is to be used for irrigation of open and infected wounds, and for general use, my improved solution may be diluted to the extent of one gallon of water to one-half to two drams of the germicide solution, and still have ample strength for all practical purposes. In the case of employing my improved germicide solution in connection with an ointment for local application to superficial wounds and ulcers and other skin infection, the same may be used by combining equal parts by volume of paraffin oil and the solution, and notwithstanding the high percentage of chlorin contained in the compound, no undue irritation results. In use with vaseline or paraffin wax, approximately one-quarter to one dram of my improved germicide solution to one ounce of vaseline insures rapid healing.

I have described my improved article or product and the method of producing the same in that particularity which I deem to be the best exposition of my invention, and that which I prefer in commercial practice, but I do not restrict or confine myself to the minor or secondary details as such variations may be resorted to as of ordinary technical or mechanical skill, and without a departure from the spirit of the invention.

Having now described my invention what I claim as new and desire to secure by Letters Patent is:—

1. A germicide solution of an oily character composed of a dichlorid product derived from oil of eucalyptus, and containing a large percentage of chlorin, said solution also containing acid constituents including hydrochloric acid in sufficient quantity to give to it a definite acid nature.

2. A germicide solution of an oily character composed of a dichlorid product derived from oil of eucalyptus and containing a large percentage of chlorin, said solution also containing acid constituents in sufficient quantity to give it a definite acid nature.

3. The germicide solution according to claim 2, further characterized by the dichlorid product containing approximately 31 per cent. of chlorin by weight.

In testimony of which invention, I hereunto set my hand.

CHARLES A. WEEKS.